United States Patent [19]

Kaltz et al.

[11] Patent Number: 4,553,307
[45] Date of Patent: Nov. 19, 1985

[54] METHOD FOR INSTALLING A SLIDING ROOF PANEL ASSEMBLY

[75] Inventors: Milton C. Kaltz, Allen Park; David C. Garascia, Novi; Michael E. Kilpinen, Northville, all of Mich.

[73] Assignee: ASC Incorporated, Southgate, Mich.

[21] Appl. No.: 571,561

[22] Filed: Jan. 17, 1984

[51] Int. Cl.⁴ .............................................. B23P 11/00
[52] U.S. Cl. .................................... 29/434; 29/401.1; 29/526 R; 296/222
[58] Field of Search ....................... 29/401.1, 428, 434, 29/526 R; 296/216, 221, 222

[56] References Cited

U.S. PATENT DOCUMENTS

| 3,066,976 | 12/1962 | Rehmann | 296/222 |
|---|---|---|---|
| 3,075,807 | 1/1963 | Werner | 296/216 |
| 3,078,122 | 2/1963 | Werner | 296/222 |
| 4,085,965 | 4/1978 | Schlapp | 296/221 X |
| 4,159,144 | 6/1979 | Ehlen et al. | 296/222 |
| 4,251,104 | 2/1981 | Holt | 296/222 X |
| 4,296,961 | 10/1981 | Hunt et al. | 296/216 |
| 4,379,586 | 4/1983 | Kaltz et al. | 296/222 |
| 4,422,687 | 12/1983 | Kaltz et al. | 296/221 |
| 4,466,656 | 8/1984 | Igel | 296/216 |

Primary Examiner—Charlie T. Moon
Attorney, Agent, or Firm—Basile Weintraub Hanlon

[57] ABSTRACT

A method for installing a modular sliding roof panel assembly in a vehicle having an opening in the roof. The sliding roof panel assembly includes a roof panel movably mounted on a housing. A reinforcement ring having a central aperture with a shape complementary to the shape of the roof opening is connected to the housing prior to attachment of the reinforcement ring to the edges of the stationary roof structure bounding the roof opening.

2 Claims, 8 Drawing Figures

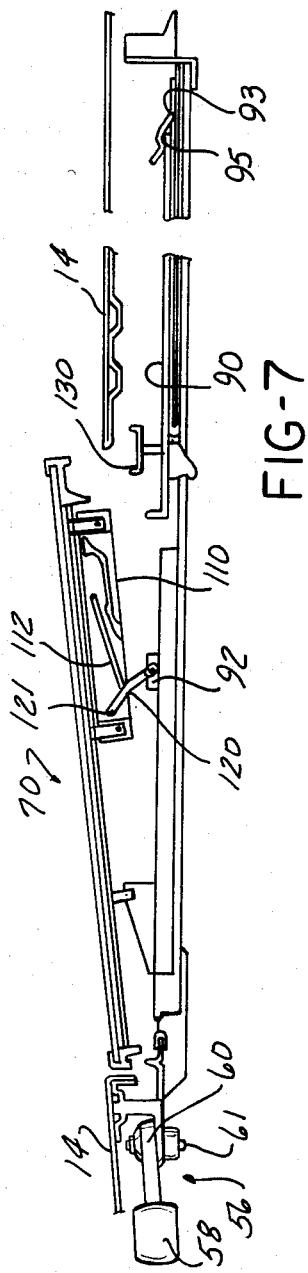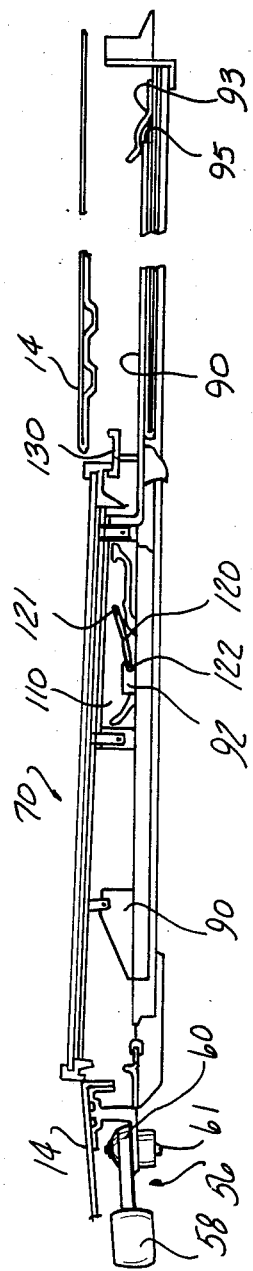

METHOD FOR INSTALLING A SLIDING ROOF PANEL ASSEMBLY

BACKGROUND OF THE INVENTION

1. Field of the Invention

This invention relates, in general, to vehicle roof structures having a movable roof panel for opening and closing an opening in the roof of a vehicle and, more specifically, to methods for installing movable roof panels in vehicles.

2. Description of the Prior Art

In today's automobile market, a popular option is a so-called "sunroof". Sunroofs generally are available in two types, either in the form of a movable roof panel which is retractable between closed and opened positions in an opening formed in the roof of a vehicle or a flip-up ventilator version which is pivotal about a front end to raise the rear edge of the roof panel a small distance above the stationary roof structure of the vehicle. It is also known to construct a movable roof panel which is both flip-up and sliding as shown in U.S. Pat. Nos. 4,085,965; 4,379,586 and 4,422,687.

In previously devised sunroof assemblies, a roof panel is movably mounted in a housing by means of a suitable linkages and drive mechanism for pivotal and sliding movements. A reinforcement ring having an interior opening with a shape complimentary to the shape of the roof opening is employed to provide structural support for the sunroof housing. Such reinforcement rings, in the past, have been initially secured by welding to the edges of the roof strucutre bounding the opening. The housing containing the removable panel, linkage and drive mechanism is then brought into engagement with the reinforcement ring and secured thereto by suitable fasteners or adhesives.

However, such an installation procedure encounters problems due to manufacturing tolerances in the vehicle roof structure. Since the reinforcing ring is initially attached to the roof of the vehicle before the housing is brought into engagement with the reinforcement ring, any variation that exists in the normal lateral contour of the vehicle roof bounding the roof opening makes it impossible for the roof panel to be brought into flush alignment with the roof such that unacceptable gaps or spaces are created between the edges of the vehicle roof and the movable roof panel.

Furthermore, due to the construction variations in the vehicle roof structure and the roof panel assembly itself, adjustment of the height of the roof panel is frequently required to place the roof panel in flush alignment with the surrounding roof structure of the vehicle. However, this is at best a difficult and time-consuming procedure, particularly since the roof panel has already been mounted in the vehicle.

Thus, it would be desirable to provide a method for installing a sliding roof panel assembly in a vehicle which would overcome problems existing with previously devised installation procedures. It would also be desirable to provide a method for installing a sliding roof panel assembly which is easy and quick and, at the same time, enables the movable roof panel to be installed in the roof opening of the vehicle in a precise and accurate manner despite any size variations that may exist in the vehicle roof strucure, roof opening or roof panel assembly.

SUMMARY OF THE INVENTION

The present invention is a new method for installing a modular sliding roof panel assembly in a vehicle having an opening in the roof. The modular sliding roof panel assembly includes an integral housing constructed of a plastic material which carries a movable roof panel, guide rails, front and rear guide shoes and a drive mechanism which interact to move the roof panel between open and closed positions. Guide blocks mounted on the edges of the roof panels interact with cam followers connected to the rear guide shoes to selectively lower the rear edge of the roof panel below the stationary roof structure as the roof panel slides rearward to the open position and to raise the rear edge of the roof panel a short distance above the stationary roof structure as the roof panel is pivoted about the front guide shoes.

The sliding roof panel assembly of the present invention also includes a reinforcement ring having an aperture with a shape complimentary to the shape of the vehicle roof opening. The reinforcement ring is attached to the housing by means of suitable fasteners prior to the raising of the sliding roof panel assembly into engagement with the interior surface of the vehicle roof structure bounding the edges of the roof opening.

The method for installing a sliding roof panel assembly of the present invention overcomes several of the problems encountered with previously devised movable roof panel installation procedures. By uniquely attaching the reinforcement ring to the roof panel housing prior to the mounting reinforcement ring on the roof strucutre of the vehicle, any gaps or spaces between the edges of the movable panel and the edges of the roof opening caused by dimensional variations in the contour of the vehicle roof are eliminated.

Since the stack height of the roof panel, guide shoes, guide channels and pivoting linkages above the housing are precisely known, the reinforcement ring can be attached to the housing at a position which will insure that the roof panel will be in flush alignment with the adjacent roof structure when the reinforcement ring is attached to the vehicle roof. Any variations that may exist between the contours of the roof panel and adjacent roof structure can be eliminated by clamping the vehicle roof to the reinforcement ring thereby conforming the contours of the vehicle roof structure to that of the roof panel and reinforcement ring.

BRIEF DESCRIPTION OF THE DRAWING

The various features, advantageous and other uses of the present invention will become more apparent by referring to the following detailed description and drawing in which:

FIG. 7 is a sectional view showing the sliding roof panel assembly in the flip-up, ventilator position; and FIG. 8 is a sectional view showing the sliding roof panel assembly in the lowered position.

DESCRIPTION OF THE PREFERRED EMBODIMENTS

Figure 1:
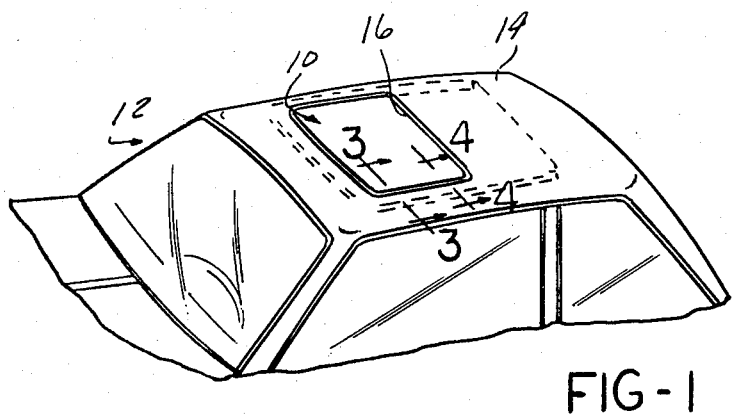
FIG. 1 is a partial pictorial view of a vehicle having a sliding roof panel assembly constructed according to the teachings of the present invention mounted therein.

Throughout the following description and drawing, an identical reference number is used to refer to the same component shown in multiple figures of the drawing.

Referring now to the drawing, and to FIG. 1 in particular, there is shown a modular sliding roof panel assembly 10 which is adapted to be mounted in the roof of a vehicle 12. The vehicle 12 includes a stationary roof structure 14 having an opening 16 formed therein. The opening 16 is preferably of rectangular configuration and is situated over the front seat of the vehicle 12. The opening 16 is opened and closed by a movable roof panel which slides between closed and opened positions as well as pivoting to a flip-up position.

Figure 2:
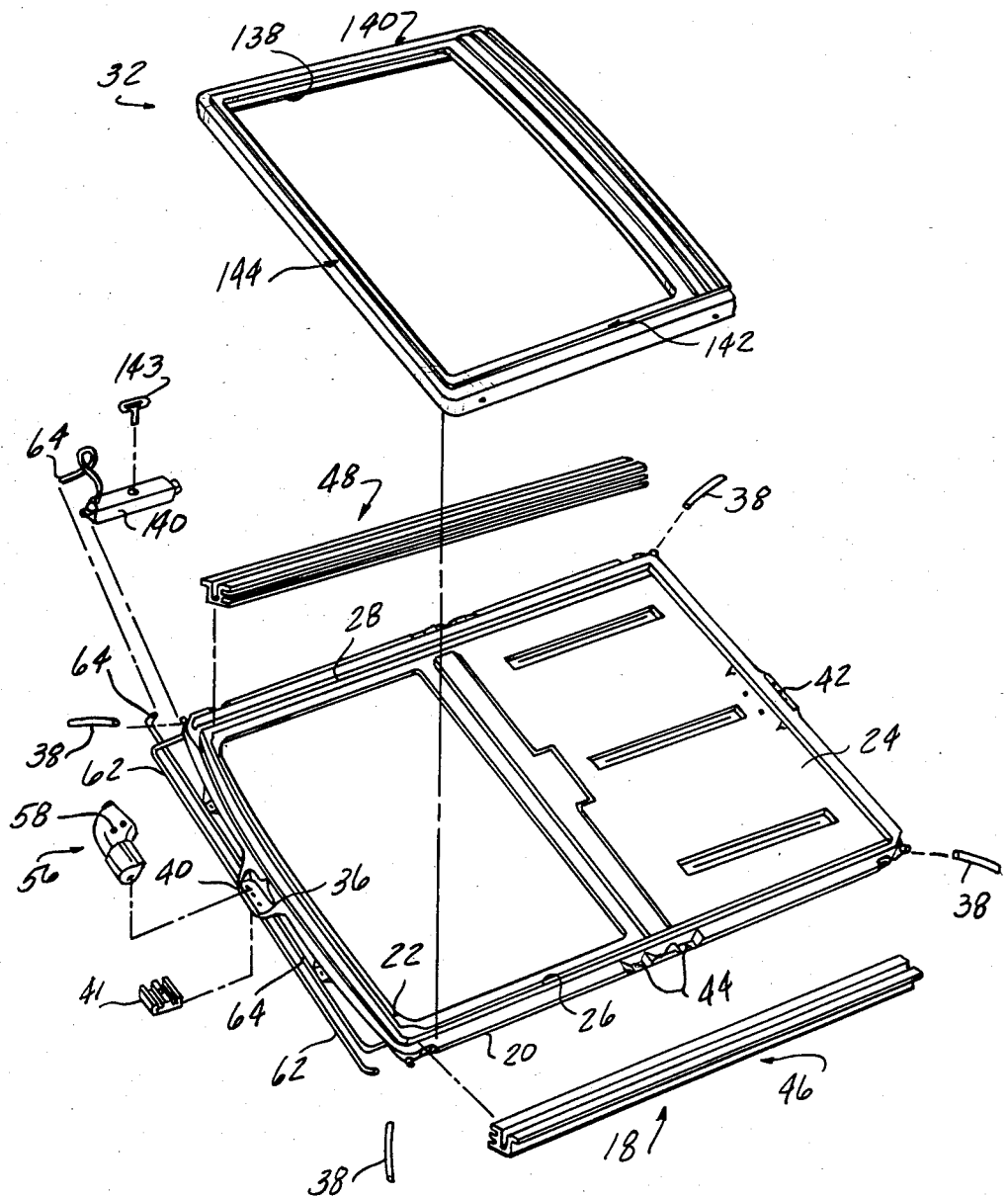
FIG. 2 is an exploded pictorial view of the sliding roof panel assembly.

Referring now to FIG. 2, there is shown a frame or housing assembly 18 which is adapted to be mounted to the interior of the stationary roof structure 14 of the vehicle 12. The frame 18 includes an integrally formed substantially rectangular housing 20. The housing 20 includes an aperture 22 which is configured to the approximate shape of the opening 16 in the roof 14 of the vehicle 12 and a planar solid rear section 24.

Preferably, the housing 20 is formed in an integral one piece unit from a stamped, lightweight material, such as fiberglass sheet molding compound (CSMC). Other materials, such as nylon or polypropylene based compounds, having the requisite high strength and lightweight properites may be used to form the housing. The housing 20 is formed to include mounting brackets, drain openings and stiffening ribs, as well be described in greater detail hereafter. Specifically, the housing 20 is formed with side drain troughs 26 and 28 which extend longitudinally along the sides of the housing 20.

Figure 3:
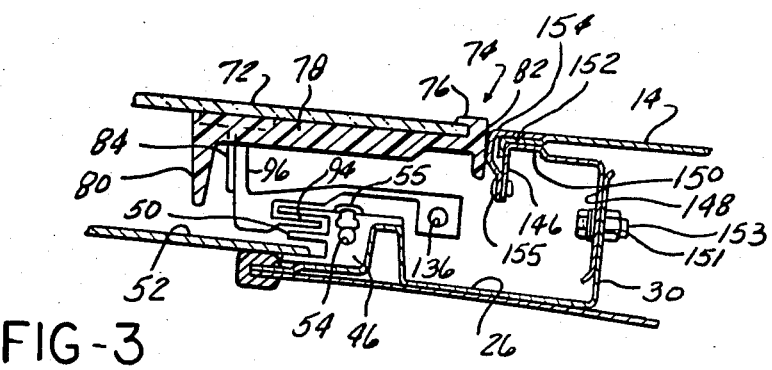
FIG. 3 is a cross-sectional view, generally taken along line 3—3 in FIG. 1.
Figure 4:
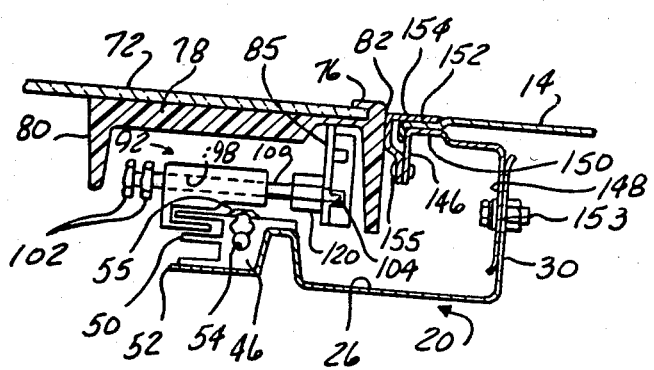
FIG. 4 is a cross-sectional view, generally taken along line 4—4 in FIG. 1.

As shown in FIGS. 2, 3 and 4, the housing 20 is formed with an outwardly extending flange portion 30 which is secured to a panel opening reinforcement member or ring 32. Each of the identically formed side drain troughs, such as drain trough 26, is formed with a channel-like trough section which is connected between the outward flange 30 and an inward extending flange portion 34 which services as a mounting base for the guide tracks of the movable roof panel assembly, as described in greater detail hereafter.

The side drain troughs 26 and 28 communicate with a front drain trough 36, shown in FIG. 2, which extends across the front of the housing 20. The corners of the housing 20 are formed with hollow conduits 38 which are adapted to be connected to suitable conduits or tubes which extend through the body of the vehicle 12 to form means for diverting water collected in the drain troughs 26, 28 and 36 of the housing 20 from the movable roof panel assembly 10 of the present invention.

Finally, the housing 20 is formed with front and rear mounting pads 40 and 42, respectively. The mounting pads 40 and 42 serve as a means for mounting the drive means, described hereafter, to the housing 20. This enables the drive means to be selectively mounted on either of the front or rear edges of the housing 20 depending upon the particular vehicle construction and application of the movable roof panel assembly 10 of the present invention.

As described above, and shown in FIGS. 2, 3 and 4, the housing 20 is connected to a panel opening reinforcement ring 32 which is of substantially rectangular configuration. The panel opening reinforcement ring 32 is formed of a metallic material, such as steel.

The reinforcement ring 32 has a rectangular configuration with centrally located aperture 138 which is shaped complimentary to the shape of the opening 16 in the roof 14 of the vehicle. The two side and front sections 140, 142 and 144 of the reinforcement ring 32 each have a substantially U-shaped configuration formed of inner and outer legs 146 and 148, respectively, and a center bight section 150. Spaced apertures 151 are formed in the outer legs 148 for attachment purposes as described hereafter.

The reinforcement ring 32 is secured to the housing 20 prior to being brought into engagement with the interior surface of the vehicle roof structure 14 bounding the edges of the roof opening 16. Suitable fasteners, such as nuts and bolts 153 are employed to attach the outer legs 148 of the side members 140 and 142 of the reinforcement ring 32 to the upstanding flanges 30 on the housing 20 by insertion through the spaced apertures 151 in the outer legs 148 and corresponding aperture in the upstanding flanges 30 of the housing 20.

In installing the connected reinforcement ring 32 and the housing to the roof structure 14 of the vehicle, as shown in FIGS. 3 and 4, the connected reinforcement ring 32 and housing flange portion 30 are brought up into engagement with the edges of the roof 14 bounding the edges of the roof opening 16 until the center bight portions 150 of the side members 140 and 142 of the reinforcement ring 32 are in registry with a downwardly extending flange and notch section 152 formed on the edges of the vehicle roof structure 14. Suitable fastening means, such as adhesives, may be employed to attach the center portions 150 of the reinforcement ring 32 to the edges of the vehicle roof structure 14.

A rectangular trim ring 154 having a shape complimentary to the shape of the roof opening 16 is brought into engagement with the notched portion 152 on the edge of the roof structure 14 bounding the roof opening 16 and is secured to the inner legs 146 of the reinforcement ring 32 by suitable fasteners 155, such as rivets, screws, etc. The trim ring 154 closes the space between the edge of the roof structure 14 and the outer edge of the roof panel 72 and provides a pleasing, decorative appearance to the roof panel assembly.

As shown in FIG. 2, and in greater detail in FIGS. 3 and 4, the movable roof panel assembly 10 includes a pair of guide tracks 46 and 48 which are mounted to the inward extending flange 34 of the housing 20. The guide tracks 46 and 48 are in the form of elongated members which are mounted on opposite sides of the vehicle 12 and extend in the sliding direction of the movable panel.

Each of the guide tracks 46 and 48 are formed with spaced flanges which define upper and lower tracks 50 and 52, respectively. The upper track 50 is adapted for engaging the guide shoe attached to the movable roof panel and serves to control the movement of the roof panel between open and closed positions. The lower track 52 is adapted for mounting a movable sunscreen, described hereafter, therein to enable the sunscreen to be moved between open and closed positions as desired. Each of the guide tracks 46 and 48 is formed with an integral bore 54 which extends longitudinally through the guide tracks 46 and 48. The bore 54 serves as a guide for the thrust transmitting cables utilized in the drive means of the present invention. A clip 55 is insertable in a recess formed in the top of the guide tracks 44 and 46 and in communication with the bore 54 to seal the bore 54.

As shown in FIG. 2, drive means 56 are provided for moving the movable roof panel between open and closed positions as well as between the closed position and a flip-up venting position. According to the preferred embodiment, the drive means 56 includes an electric drive motor 58 which has its output shaft connected to a gear assembly 60 which terminates in a bevel gear 61 as shown in FIGS. 7 and 8. The motor 58 and gear assembly 60 are mounted to either of the front or rear mounting pads 40 and 42 in the housing 20 such that the bevel gear 61 extends downward through an aperture in the mounting pad.

The movable roof panel is driven by the motor 58 and gear assembly 60 via thrust transimtting drive cables 62 and 64 which have one end secured to the rear guide shoes. The drive cables 62 and 64 have a helically wound structure on their surfaces adapted to engage the bevel gear 61. As the drive gear rotates, the cables 62 and 64 move in translation resulting in movement of the movable roof panel assembly linearly between its open or closed position as well as between closed and flip-up venting positions. The motor 58 is reversable and can be actuated to open or retract the movable roof panel assembly via a suitable switch or switches, not shown.

As shown in FIG. 2, the drive motor 58 and gear assembly 60 are secured to the front mounting pad 40 such that the bevel gear 61 extends downward through an aperture in the mounting pad 40. A block 41 is mounted to the bottom side of the front mounting pad 40. The block 41 has a pair of longitudinally extending bores extending therethrough adapted to slidingly receive the thrust transmitting cables. A perpendicular bore extends through the block 41 centrally between the longitudinal bores. The perpendicular bore receives the bevel gear 61 which engages the sides of the cables to cause movement thereof.

Figure 5:
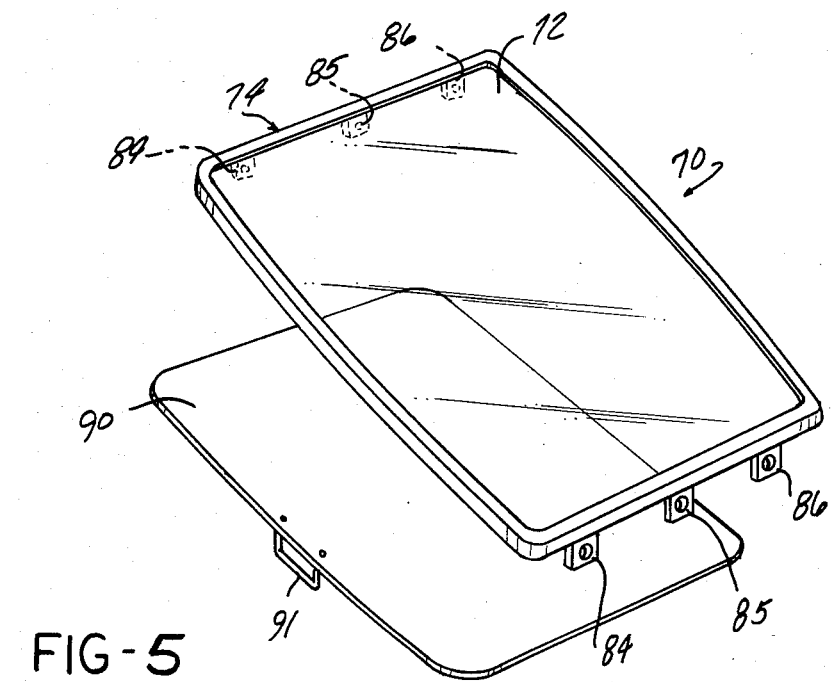
FIG. 5 is an exploded, pictorial view of the movable roof panel.

Referring now to FIG. 5, there is shown the detailed construction of the movable roof panel assembly 70. The movable roof panel assembly 70 includes a rectangularly shaped panel 72 which preferably is formed of transparent glass. The panel 72 is formed to approximately the same shape as the opening 16 in the roof 14 of the vehicle 12 so as to completely close the opening 16 when moved to the closed position. A casing or gasket 74 formed of a plastic material, such as polyvinyl chloride, is molded around the peripheral edge of the panel 72 and forms a means for supporting the panel 72. As shown in greater detail in FIGS. 3 and 4, the casing 74 is formed with an upper lip 76 which extends over the upper surface of the panel 72. Downward extending flanges 80 and 82 extend from the base portion 78 and have a varying cross-section along the length of the panel 72. Mounting brackets 84, 85 and 86 are integrally molded in the casing 74 along the side edges of the panel 72 and extend downward therefrom to provide a suitable mounting or support means for the various components of the sliding roof assembly, as described in greater detail hereafter.

As shown in FIGS. 3 and 5 the brackets 84, 85 and 86 each have a substantially T-shaped configuration with the upper portion being molded and secured in the casing 74. A flange or leg 87 extends downward from the upper portion and has an aperture formed therein for mounting the sliding panel assembly.

The movable roof panel assembly 70 includes a manually operable sunscreen 89 formed of an opaque material. The sunscreen 89 rides in the lower track 52 of the guide tracks 46 and 78 and enables the interior of the vehicle 12 to be completely closed off from view. A handle 91 is affixed to the front of the sunscreen 89 to enable the sunscreen 89 to be moved between open and closed positions as desired by the occupant of the vehicle 12. Further, a spring clip 93, as shown in FIG. 7, is mounted to the rear of the housing 20 and engages a bracket 95 mounted on the rear edge of the sunscreen 89 to securely retain it in the full-open position.

As shown in FIGS. 3 and 4, a pair of front and rear guide shoes located on opposed sides of the movable panel 70 are connected to the movable panel 70 and engage the guide tracks 46 and 48 to control the sliding of the movable panel 70 between open and closed positions.

As shown in FIG. 3, each of the front guide shoes 90 are formed with a flange portion 94 which engages the upper track 50 in the guide tracks 46 and 48. The front guide shoes 90 further include an upwardly extending flange portion 96 which is pivotally connected to the mounting bracket 84 in the movable panel casing 74 to enable the movable panel 72 to be pivoted about the front guide shoes 90, as described hereafter. The front guide shoes 90 are mounted parallel to the longitudinal center line of the vehicle and are positioned directly above the guide tracks 46 and 48 to increase the amount of light opening or viewing area of the movable roof panel assembly of the present invention.

The rear guide shoes 92, shown in FIG. 4, are located adjacent the rear edge of the movable panel 72 and have one end of the drive cables 62 and 64 integrally molded or secured thereto. Thus, translation of the drive cables 62 and 64 in either forward or reverse directions will move the rear guide shoes 92 linearly along the guide tracks 44 and 46 which, in turn, will cause sliding movement of the movable roof panel assembly 70 and the front guide shoes 90 between opened and closed positions within the roof opening 16.

Each of the rear guide shoes 92 are further provided with a lateral bore 98 which is adapted to receive a threaded shaft 100. The ends of the threaded shaft 100 extend outward beyond the sides of the rear guide shoes 92. A pair of fasteners, such a threaded nuts 102, threadingly engage one end of the shaft 100 with respect to the rear guide shoe 92. The opposed end of the shaft 100 is formed with a reduced diameter end section 104 which is adapted to engage and ride within a cam track in a guide bracket, as described in greater detail hereafter.

Figure 6:
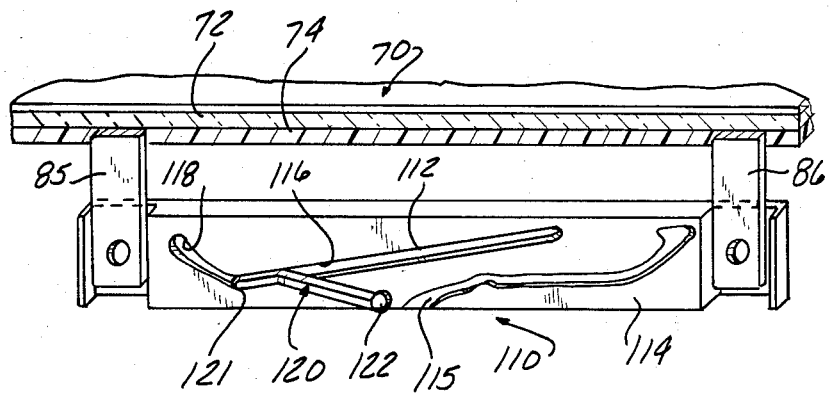
FIG. 6 is a plan view of one of the guide brackets.

Referring now to FIG. 6, there is shown one of a pair of symmetrically formed guide brackets 110 which are mounted to the longitudinal edges of the movable panel assembly 70 between front and rear guide shoes 90 and 92. As shown in FIG. 6, the guide bracket 110 is mounted by suitable fasteners to the mounting brackets 85 and 86 carried by the casing 74 of the movable roof panel assembly 70.

The guide bracket 110 includes first and second cam tracks 112 and 114. The first cam track 112 includes a first inclined portion 116 which extends upward from a curved or arcuate second portion 118. One end 121 of a cam follower 120 is slidingly secured within the first cam track 112 for sliding movement therealong. The second cam track 114 is generally inclined upward along its length and has an open end 115. The shaft 100 extending through the rear guide shoe 92, as shown in FIG. 4, is adapted to engage the second track 114 and move therealong. This provides additional stability for the movable roof panel assembly 70 throughout its sliding movement. The second end of the cam follower 120 is pivotally mounted on the shaft 100, FIG. 4, to provide a pivotal action for the cam follower 120.

Thus, the second end 122 of the cam follower 120 is maintained in the same horizontally extending plane throughout the sliding movement of the movable roof panel assembly 70. However, the first end 121 of the cam follower 120 pivots about the shaft 100 resulting in pivotal movement of the guide bracket 110 and the movable roof panel assembly 70 connected thereto.

This pivotal action is illustrated in FIG. 7 in which the movable roof panel assembly 70 is depicted in the flip-up ventilator positoin. Starting from the fully closed position in which the front guide shoes 90 abut front stops 124 formed in the housing 20, energization of the drive means 56 will cause translation of the drive cables and movement of the rear guide shoes 92 to the front of the vehicle or to the left as viewed in FIG. 7. The drive force generated by the drive cables causes the first end 121 of the cam follower 120 to move up the arcuate portion 118 of the cam track 112 in the guide bracket 110 and the rear edge of the roof panel assembly 70 connected thereto to rise, pivoting the entire roof panel assembly 70 about the front guide shoes 90.

Reversal of the drive motor 58 causes a reverse movement, lowering the roof panel assembly 70 until it is flush with the surface of the stationary roof structure of the vehicle.

The guide brackets 110 also function to lower the rear edges of the roof panel assembly 70 below the rear edge of the stationary roof structure so that the roof panel 70 can be slid rearward to the open position, as depicted in FIG. 8. As shown therein, actuation of the drive means 56 to move the roof panel assembly 70 from the closed to the open position initially causes the first end 121 of the cam follower 120 to move along the cam track 112. As the second end 122 of the cam follower 120 is fixed for movement along a horizontally extending plane, pivoting of the cam follower 120 about its second end 122 forces the guide bracket 110 and the rear edge of the movable roof panel assembly 70 connected thereto downward to clear the rear edge of the stationary roof structure 14 of the vehicle such that the roof panel assembly 70 can be slid beneath of the rear stationary roof structure.

When the roof panel assembly 70 is moved to the closed position, the cam follower 120 and guide brackets 110 interact to raise the rear edge of the roof panel assembly 70 into flush alignment with the rear portion of the roof of the vehicle.

The sliding roof panel assembly of the present invention also includes other features, such as a water trough 130 located adjacent to the rear edge of the roof panel 72 which moves concurrently with the roof panel 72 and a control mechanism 132 which detects the position of the movable roof panel 72 for controlling the movement of the roof panel 72 between the open and closed positions as well as the closed and flip-up, ventilator positions. A detailed description of these features can be had by referring to U.S. Pat. Nos. 4,379,586 and 4,422,687, the contents of which pertaining to these features are incorporated herein by reference.

In summary, there has been disclosed an unique method for installing a modular sliding roof panel assembly in a vehicle having an opening in the roof thereof. The roof panel assembly is installed on the stationary roof strucutre of the vehicle in a quick and easy manner. By initially securing the reinforcement ring to the roof panel housing prior to attachment of the reinforcement ring to the vehicle roof structure bounding the edges of the roof opening, flush alignment of the movable roof panel with the adjacent vehicle roof structure can be assured without any spaces or gaps being formed between the edges of the roof panel and the adjacent edges of the vehicle roof opening.

What is claimed:

1. A method for installing a sliding roof panel movably mounted on a housing on the stationary sliding roof structure of a vehicle having an opening in the sliding roof thereof which is opened and closed by the sliding roof panel comprising the steps of:

fixedly attaching a reinforcement ring having a central aperture with a shape complimentary to the shape of the roof opening to a roof opening defining portion of the housing; and then assembling and fixedly attaching the reinforcement ring from inside the vehicle to the edges of the vehicle roof structure bounding the roof opening.

2. A method of claim 1 further including the step of prior to said assembling step fixedly attaching a trim ring having a shape complimentary to the shape of the roof opening to the reinforcement ring between the vehicle roof structure and the edges of the roof panel.

* * * * *